Figure 1:
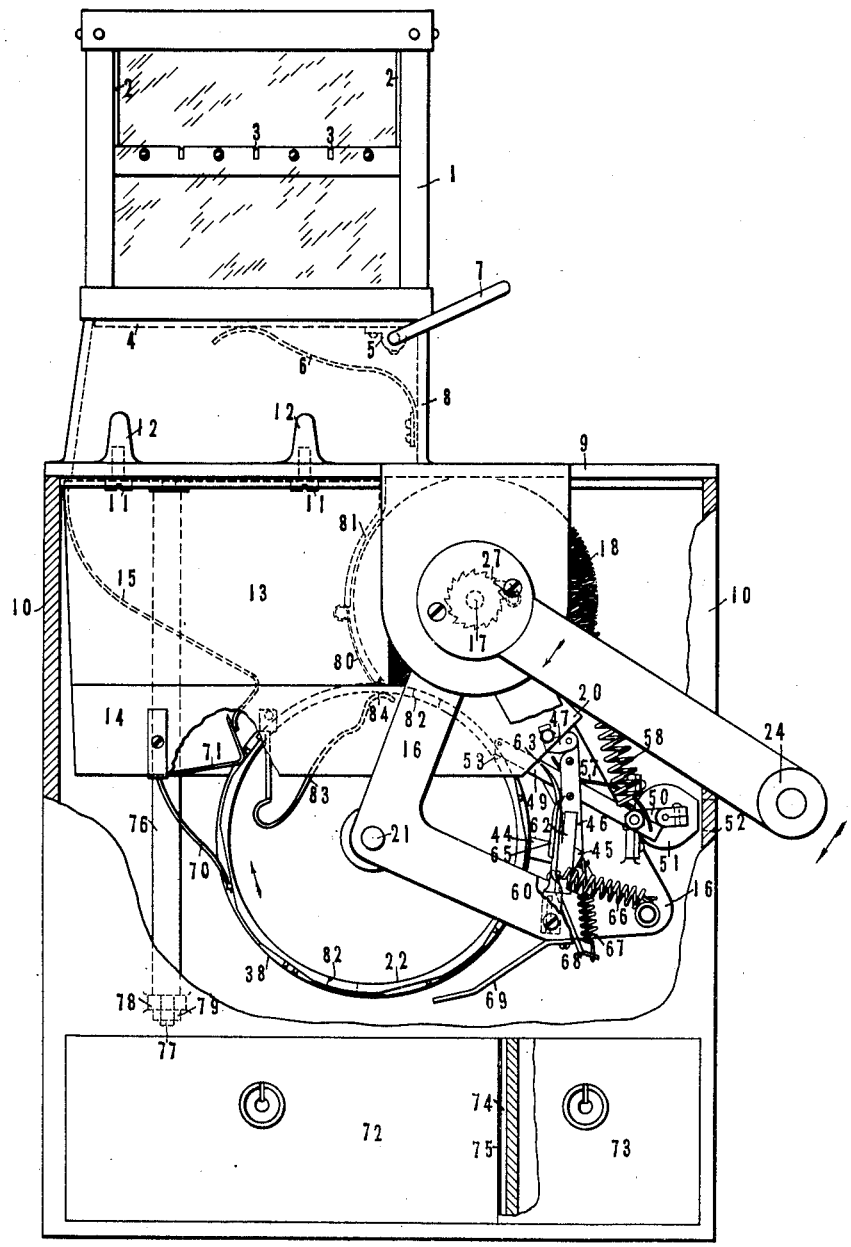

W. A. DE HART.
FARE REGISTER.
APPLICATION FILED DEC. 1, 1908.

1,096,156.

Patented May 12, 1914.
5 SHEETS—SHEET 1.

W. A. DE HART.
FARE REGISTER.
APPLICATION FILED DEC. 1, 1908.

1,096,156.

Patented May 12, 1914.
5 SHEETS—SHEET 2.

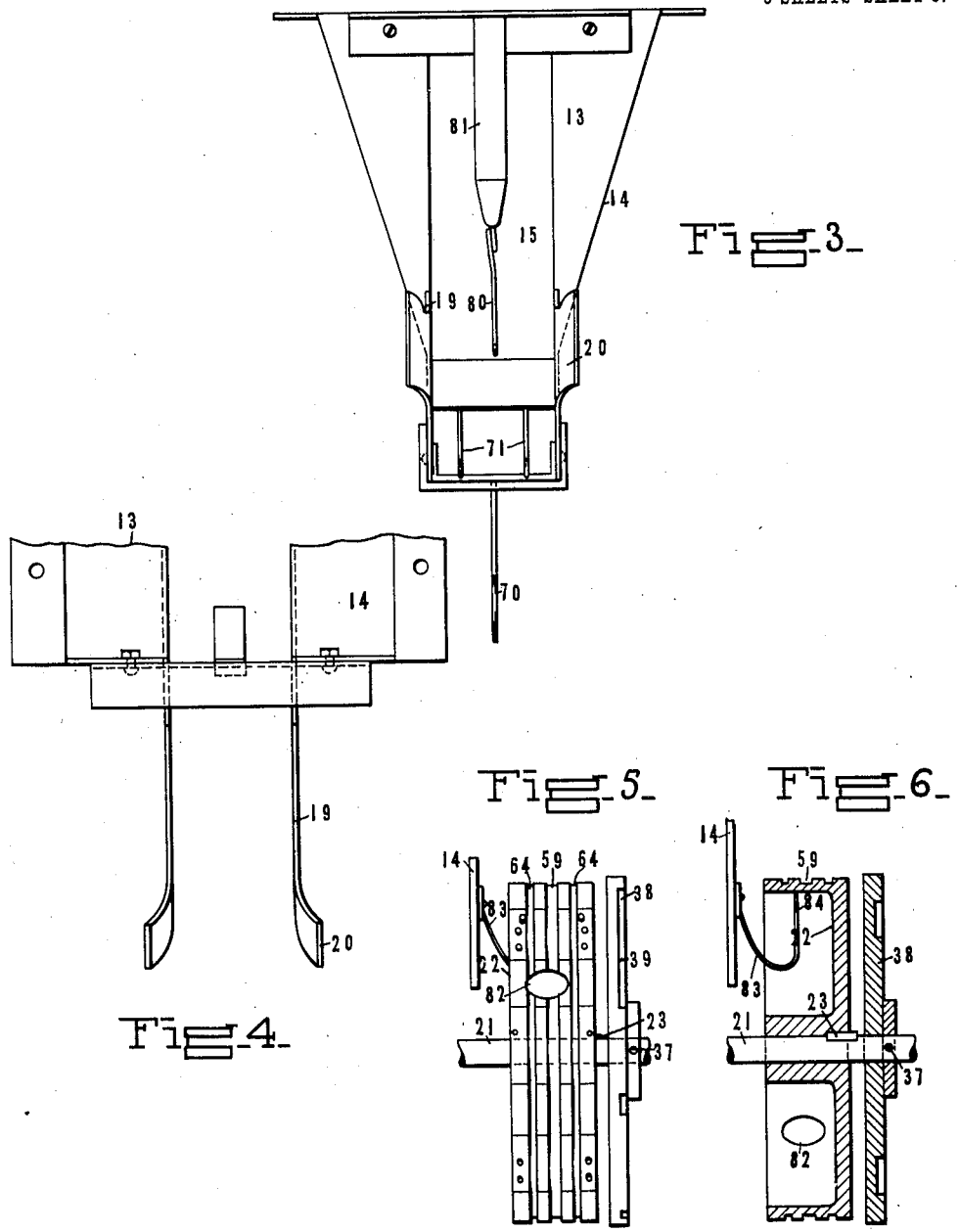

W. A. DE HART.
FARE REGISTER.
APPLICATION FILED DEC. 1, 1908.
1,096,156.
Patented May 12, 1914.
5 SHEETS—SHEET 4.
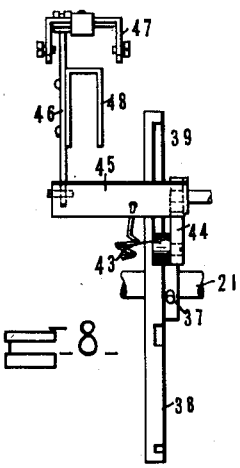
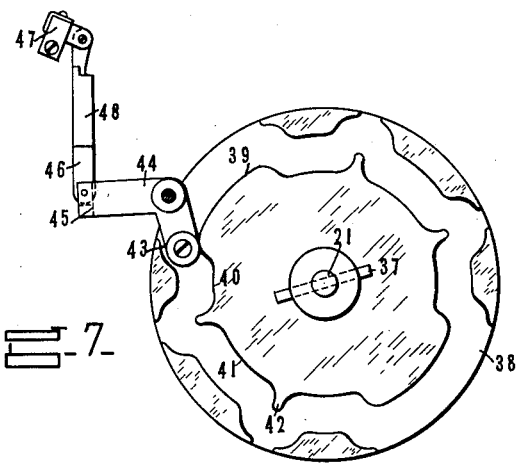
Fig. 8.  Fig. 7.
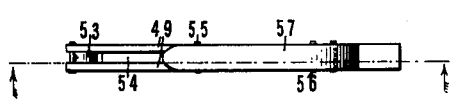
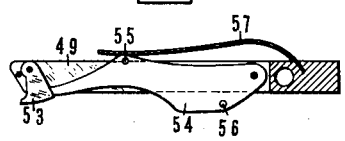
Fig. 9.  Fig. 10.
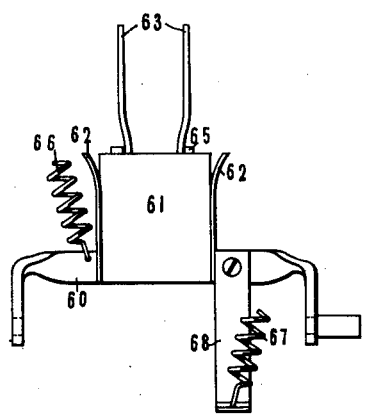
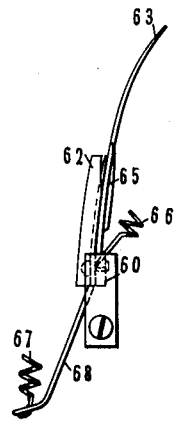
Fig. 11.  Fig. 12.
WITNESSES
INVENTOR
BY
ATTORNEYS

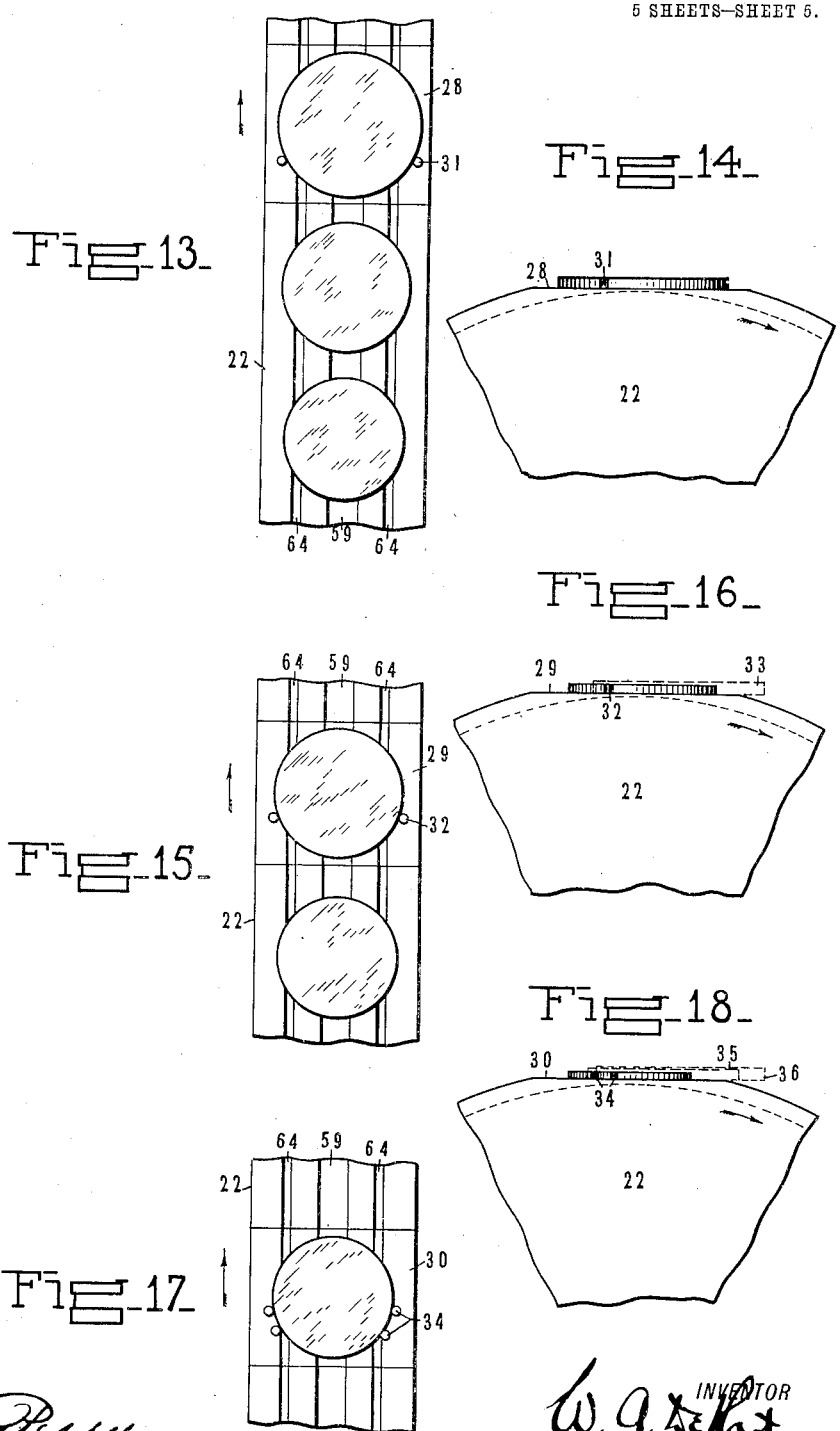

UNITED STATES PATENT OFFICE.

WILLIAM A. DE HART, OF NEW YORK, N. Y., ASSIGNOR TO JAY M. JOHNSON, OF CHICAGO, ILLINOIS.

FARE-REGISTER.

1,096,156.     Specification of Letters Patent.     Patented May 12, 1914.

Application filed December 1, 1908. Serial No. 465,515.

*To all whom it may concern:*

Be it known that I, WILLIAM A. DE HART, a citizen of the United States, residing at New York, in the county of New York and State of New York, have invented certain new and useful Improvements in Fare-Registers, of which the following is a full, clear, and exact description, such as will enable others skilled in the art to which it appertains to make and use the same.

This invention relates to fare registers and to devices of this character with regard to the more specific features thereof for use on street railway cars.

One of the objects of the invention is to provide a practical device of this general nature which will keep accurate account of the money which is placed therein.

Another object is to provide an effective device of this character which will prevent employees from retaining any of the receipts of the company, either dishonestly or inadvertently.

Further objects are to provide a device of the above type which is of compact and durable construction and proof against accidental or intentional misuse.

Other objects will be in part obvious and in part pointed out hereinafter.

The invention, accordingly, consists in the features of construction, combinations of elements and arrangement of parts which will be exemplified in the construction hereinafter set forth and the scope of the application of which will be indicated in the following claims.

In the accompanying drawings, which represent one of various possible embodiments of my invention similar reference characters refer to similar parts throughout the several figures.

Figure 2:
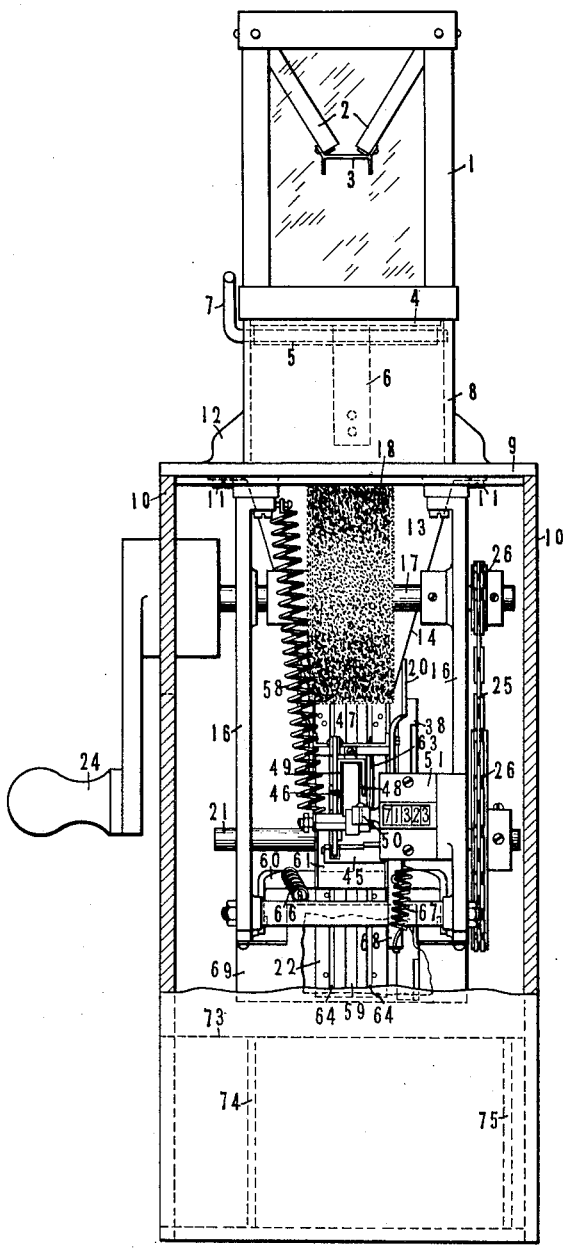

Figure 1 is a side elevation thereof, parts of the casing being broken away for the sake of clearness; Fig. 2 is a front end elevation, part of the casing being removed; Fig. 3 is a front view of a coin receiver and its associated parts; Fig. 4 is a partial plan view of the receiver shown in Fig. 3; Fig. 5 is end view of a drum; Fig. 6 is a sectional view taken on a vertical diameter of Fig. 5; Fig. 7 is a view in side elevation of a cam and its associated parts; Fig. 8 is an end view of the parts shown in Fig. 7; Fig. 9 is a top plan of a register-actuating lever; Fig. 10 is a sectional view taken on line X—X of Fig. 9; Fig. 11 is a view in elevation of coin-selecting mechanism; Fig. 12 is an edge view of the parts shown in Fig. 11; Figs. 13 to 18 inclusive are detailed views illustrating the means for selecting and retaining coins upon the drum.

Referring now to Fig. 2 of the drawings, 1′ indicates a box the walls of which are preferably constructed of some transparent material, as glass, provided with an open top from which the converging glass guides 2—2 of the chute extend downwardly, their lower edges being separated from one another sufficiently to permit a coin to pass therebetween. Suitable bridging pieces 3 extend across the opening formed between the lower edges of the members 2 and are secured thereto in any suitable manner, said bridging pieces being spaced from one another and forming a grating to permit coins of certain sizes only to pass therebetween. In the present instance, these bridging pieces will permit the passage of nickels, dimes and pennies, but will prevent the passage of all coins larger than five-cent pieces.

The box 1 is provided with a tilting bottom 4, which is preferably pivoted at one end 5, as shown in the drawings, and is normally retained in its uppermost or closed position by means of a suitable spring 6. A handle 7, secured to said bottom, is employed for swinging the same about its pivotal point when it is desired to allow the coins deposited within the box to pass into the other parts of the apparatus as hereinafter described.

The box 1 is preferably provided with a base 8, which is secured to an upper portion or cover plate 9 of a casing 10 by means of the screws 11 which take into the lugs 12 formed thereon. As the bottom of the box is tilted after the coins have been inspected, they drop into a receiver-receptacle or hopper 13 comprising side walls 14 and an end wall 15, which are secured to the upper portion of the casing in any suitable manner. Also supported by cover 9 is a depending frame 16 within which is journaled a shaft 17 secured to which is a circular brush 18 the bristles of which are of some relatively stiff material, preferably metallic. This brush projects within the front end of the receiver 13 between the side walls thereof, and the bristles are kept in compact form by means of the wings 19 extending forwardly from said side walls and preferably having their outer ends flared slightly outward, as shown at 20 in Fig. 4. Also journaled within the frame 16 is a shaft 21 upon which a drum 22 is secured in any suitable manner, as by means of a key 23, said drum extending within the receiver 13 and having its peripheral surface engaged by the brush 18, as clearly shown in Fig. 1. A suitable crank 24 is secured to the shaft 17 whereby it may be rotated, and rotary motion is simultaneously imparted to the shaft 21 by any suitable means, such as a sprocket chain 25 engaging sprocket wheels 26 mounted on shafts 17 and 21. A ratchet connection of any well-known type is preferably interposed at 27 between crank 24 and shaft 17 whereby the latter can be turned in one direction only by the crank.

In order to selectively remove the coins from within the receiver, the peripheral surface of the drum 22 is provided with a plurality of flattened portions 28, 29 and 30. The length of each of the portions 28 is slightly greater than the diameter of a five-cent piece, and is provided with pins 31 adapted to engage and retain a five-cent piece thereon, but spaced from one another sufficiently to permit pennies or dimes to pass therebetween, as clearly illustrated in Fig. 13. In the embodiment shown, there are provided four of such portions, but it will, of course, be understood that this invention is not limited to any particular number thereof.

The length of each of the portions 29 is slightly greater than the diameter of a penny, and is provided with pins 32 adapted to engage and retain pennies therein, said pins being spaced from one another a sufficient distance to permit a ten-cent piece to pass therebetween, as shown in Fig. 15. The pins 32, upon these portions 29, will also engage five-cent pieces, which are of greater diameter than the pennies, but such pieces, when engaged by the pins, will project forwardly and overhang the flattened portion, as indicated by dotted lines 33 in Fig. 16, for a purpose hereinafter described. In the embodiment shown, the drum is provided with two such flattened portions.

The length of each of the flattened portions 30 is slightly greater than the diameter of a ten-cent piece, and is provided with pins 34 adapted to engage and retain ten-cent pieces thereon, as illustrated in Fig. 17. These pins will, of course, also engage pennies and five-cent pieces, but such pieces, when thus retained, will project forwardly and overhang the flattened portion, as indicated by dotted lines 35 and 36 in Fig. 18. In the embodiment shown, the drum is provided with two such flattened portions.

The operation of the parts thus far described is as follows: The passengers boarding the car deposit the necessary coin or coins within the chute, said coins passing down into the box and resting upon the tilting bottom 4. The conductor then, after inspecting the coins, tilts the bottom downward by means of handle 7, permitting the coins thereon to slide off and fall into the receiver 13, and releases the handle, permitting the bottom plate 4 to snap up into place. The crank 24 is then rotated in the direction indicated by the arrow, thus rotating the brush 18 and the drum 22 in a direction indicated by arrows in Fig. 1. As the different flattened portions of the drum pass toward the right, with reference to Fig. 1, the pins upon the various flattened portions will engage with the coins and carry them forward in the following manner: The pins 31, associated with the flattened portions 28, will engage and carry forward five-cent pieces only; the pins 32, associated with flattened portions 29, will engage and move forward pennies or five-cent pieces. If, however, a five-cent piece is so carried, its overhanging portion, indicated by dotted lines 33 in Fig. 16, will be engaged by the bristles of the rotating brush and the coin will be thrown upward and disengaged from the pins, thereby preventing said five-cent pieces from being carried out of the receiver by the penny-engaging pins. Pennies, however, which are engaged by said pins, will lie wholly upon said flattened portions and will be permitted to be carried past the brush out of the receiver. In a similar manner, the pins 34, associated with flattened portions 30, are permitted to remove ten-cent pieces only from the receiver; for pennies or five-cent pieces, which may be engaged thereby, will have their overhanging portions engaged by the brush and be thrown back into the receiver in the manner above described. It will thus be seen that these parts permit the coins to be selectively removed from the receiver.

The registering and sorting mechanism will now be described.

Secured upon the shaft 21 in any suitable manner, as by means of a key 37, is a cam disk 38 provided with a cam surface comprising raised portions 39 and depressed portions 40 and 41, the latter of which are substantially twice the length of the former. These portions are so arranged with respect to the drum that the raised portions 39 correspond in position to the flattened portions 29 adapted to retain pennies thereon; the depressed portions 40 correspond in position to the flattened portions 28 adapted to retain the five-cent pieces; and the depressed portions 41 correspond in position to the flattened portions 30 adapted to retain the ten-cent pieces. The depressed portions of the cam surface are separated from one another by outwardly extending portions 42 for a purpose hereinafter described. A roller 43, secured to one end of a pivoted bell crank lever 44, is adapted to engage with the cam surface above described, and the other end of said bell crank lever is provided with a lateral extension 45 to which is pivoted an arm 46 the opposite end of which is pivoted to a swinging yoke 47 which, in turn, is preferably pivoted to the forwardly extending wings 19, as shown in Fig. 1. It will thus be seen that, as the cam disk rotates, the arm 46 will be caused to move upwardly or downwardly, depending upon the portion of the cam surface with which the roller 43 engages.

Secured to the arm 46 is a yoke 48 for receiving and embracing a lever 49 the forward end of which is pivoted to an arm 50, which is adapted to actuate the mechanism of a register 51, which may be of any suitable construction, and which may be viewed through a suitable opening 52 formed in the casing. The inner end of the lever 49 is preferably slotted and provided with the pivoted dog 53, which is retained in its normal position by means of an arm 54 pivoted within the slot, the movements of which are limited by pins 55 and 56 engaging the lever, said arm being urged downwardly by means of a suitable spring 57. When the roller 43 upon the bell crank 44 engages one of the depressed portions of the cam surface, thus holding the arm 46 in its lowered position, the arm 54 will assume its normal position and the dog 53 will be maintained in the path of the coins, its free end engaging a peripheral groove 59 formed on the drum 22. With the parts in this position, a coin carried upon the drum will engage the dog and, as it is held against movement by means of the arm 54, the lever 49 will be caused to move to actuate the register 51 as hereinafter described. The lever is returned to its normal position by means of the spring 58, one end of which is secured thereto and the other end of which is secured to a suitable part of the casing. When the roller 43 engages one of the raised portions of the cam surface, the lateral extension 45 of the bell crank lever 44 will be raised into engagement with the under side of the arm 54, thus causing the same to swing upward out of engagement with the dog 53. If, now, a coin carried upon the drum engages the dog, the dog will simply be rotated about its pivot and the coin will thus be allowed to pass without causing the lever 49 to be moved to actuate the register.

A swinging support 60 is pivoted to the frame 16 in any suitable manner, and is provided with an upwardly extending chute 61 the upper edges of which are preferably flared, as shown at 62, and is also provided with upwardly extending, inwardly curved fingers 63 adapted, when the support is swung inward, to engage the outer peripheral grooves 64 formed in the drum. A guide plate 65 is also preferably carried by said support for the purpose hereinafter described. The swinging support is normally retained with the fingers 63 swung away from the drum by means of the spring 66 secured thereto and to said frame, but is adapted to be swung into operative position by means of a stiffer spring 67, one end of which is secured to the lateral extension 45 of the bell crank lever 44, and the other end of which is secured to a tail piece 68 secured to the support.

A guide 69 is secured to the frame and extends in a downward direction underneath the drum 22 for a purpose hereinafter described.

A spring member 70, which may be supported upon the side walls 14 of the receiver in any suitable manner, engages the central groove 59 formed in the drum at its rearward portion, in order to strip off any coins which might adhere to the drum, and spring members 71 are provided for engaging the outer grooves 64 to prevent coins from sliding backwardly out of the receiver.

The operation of these parts will now be described. Assuming, for example, that a five-cent piece has been carried out of the receiver by means of the drum, as above described, as it approaches the rearwardly extending end of the lever 49 the roller 43 will be in engagement with one of the depressed portions 40 of the cam surface, whereby the dog 53 will be retained within the slot 59 in the manner above described. As the drum continues to rotate, the coin will, by pressing against said dog, force the lever to swing forwardly and downwardly, thus causing it to actuate the arm 50, which, in turn, will cause the register to indicate, and the length of the depressed portion 40 is such that the indicator will be moved forward one number. The roller 43 will then travel outward over one of the projections 42 and the lateral extension 45 will cause the arm 54 to move out of engagement with the dog 53, as hereinbefore described, thus permitting the dog to rotate about its pivot and permit the coin to pass by. At the same time, the upward movement of this arm will, by means of the spring 67, move the pivot support 60 inwardly, and the fingers 63 carried thereby will be moved into engagement with the outer surface of the coin to prevent it from being thrown off of the drum. The inward movement of the support 60 will also cause the guide plate 65 to assume its inner position, in which it will contact with the coin as it passes from under the fingers 63 and drops from the flattened portions 28 of the drum and will cause it to travel downward upon the inclined chute 69, by means of which it will be guided into a receptacle or drawer 72. If a ten-cent piece is moved from out of the receiver by the drum, the operation is substantially the same as above described, with the exception that, owing to the length of the cam recess 41, the arm 54 will be kept in engagement with the dog 53 for double the length of time, thereby causing the lever 49 to move the arm 50 a distance sufficient to cause the register to move forward two numbers instead of one, thus indicating that two fares have been paid for. The ten-cent piece will also be caused to drop into the receptacle 72 with the five-cent pieces in the manner above described. If, however, a penny is carried out of the receiver, the action of the parts will be as follows: In this instance, as the penny approaches the dog 53, the roller 43 upon the bell crank lever will be moved upon the raised portion 39 of the cam surface, thereby raising the extension 45, causing the arm 54 to be moved upward out of engagement with the dog 53, and at the same time permitting the supporting member 60 to be rocked to carry the fingers 63 into engagement with the outer grooves 64 upon the drum. The penny will thus cause the dog to rotate about its pivot without causing the actuation of the register and will be deflected from the peripheral surface of the drum by means of the fingers 63, over which it will ride and be directed into the chute 61, through which it will pass and drop into the receptacle or drawer 73. It will thus be seen that pennies will not actuate the registering means. The receptacle 73 which receives the pennies is locked and the key thereof kept by some person in authority, in order that it may not be opened by the conductor. The receptacle 72, on the other hand, may be opened by the conductor if it is necessary to make change; but, as all the coins which have passed into this receptacle have been registered before passing therein, it will, of course, be seen that the conductor cannot abstract and retain any money without such act being discovered.

In order to prevent the receptacle 72 from being drawn out entirely so that the mechanism can be tampered with, there is provided upon the locked receptacle 73 a lateral projection 74 spaced a suitable distance from the front portion thereof and with which a corresponding lateral projection 75 upon the receptacle 72 is adapted to engage, thus limiting the outward movement of the latter. By means of this construction, any unauthorized person is prevented from tampering with the mechanism within the casing. The upper portion of the casing is secured to the lower portion by stays 76 secured to the upper portion 9 in any suitable manner, and preferably provided with a threaded end 77 passing through a lug 78 formed on the interior of the casing and retained therein by means of the nut 79. Removal of this nut 79 is also prevented by means of the construction of the receptacles described, whereby the receptacle 72 is prevented from being withdrawn.

In order to avoid any possibility of having a coin brushed off of its proper selective means, a suitable spring 80, secured to a depending support 81, may be employed to press lightly upon the surface of the coins, but the tension of said spring will not be sufficient to prevent coins from being removed by having their overhanging portions engaged by the brush, as above described.

To prevent the coins within the receiver 13 from standing on edge, in which position they would be prevented from being removed therefrom by the drum 22, suitable openings 82 are formed in the drum between adjacent flattened portions thereof, said openings being of such size that the smallest coins may not pass therethrough. While only two of said openings are shown in the drawing, it will, of course, be understood that more may be provided if desired. A spring 83 has one of its ends affixed to any suitable support, as the side wall 14 of the receiver, and its free end 84 engages the inner surface of the drum 22 and is in alinement with the openings 82. This spring is so constructed that as the drum rotates the free end 84 will be momentarily projected through the openings 82 to strike any coin which may be resting upon its edge and, by agitating the same, will cause it to move out of its inclined position and rest upon the drum, whereby it may be removed from the receiver in the manner above described. Any small article which may maliciously or inadvertently be dropped within the receiver, will pass therefrom, by means of the openings 82, into the receptacle 72, from which it may be removed, and thus any danger of the mechanism being damaged by such articles is prevented.

From the above description it will be seen that there is provided a device of this character in which the coins deposited by the passengers are either registered upon an automatic register, or are directed into a locked compartment or receptacle, thereby avoiding any possibility of a dishonest employee taking money therefrom without such act being discovered.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:

1. In a fare register, in combination a receiver, a rotatable carrying element forming one wall thereof, adapted to carry coins of various denominations, registering mechanism, a lever forming a part thereof in one position making said mechanism inoperative and in another, operative, and a cam for controlling the movement of said lever.

2. In a device of the class described for registering coin of various denominations, a carrying element for said varied coins, registering mechanism, mechanism operated by the coins on said carrying element for actuating said registering mechanism, a lever by certain movement thereof adapted to maintain said actuating mechanism inoperative, and a cam adapted to rotate with said carrying element and to cause movement of said lever to control the operating periods of said actuating mechanism according to the denomination of coin on said carrying element.

3. In a device of the class described a receiver, a coin carrying element forming one wall thereof, a cam rigidly connected therewith, a register, actuating mechanism for said register, a lever adapted to move said actuating mechanism into inoperative position to prevent registering a coin, and connections between said cam and said lever to properly actuate said lever at times when coins of certain denominations are being carried from said receiver on said carrying element.

4. In a fare register in combination a receiver adapted to receive coin of various denominations, an externally grooved drum having flattened portions of different lengths on the outer surface thereof to receive coin of different denomination, pins to retain the coin on said portions, and means co-acting with said drum to disturb coins held upon the flattened portions other than their allotted portions.

5. In a fare register, in combination, a receiver adapted to receive coins of various denominations, a drum adapted to move the coins therefrom, said drum being provided with flattened portions of different lengths to receive coins of different denominations, pins associated with each of said flattened portions to retain the coins thereon, and means co-acting with said drum to disturb coins held upon flattened portions other than their allotted portions.

6. In a fare register, in combination, a receiver adapted to receive coins of various denominations, a drum adapted to selectively remove coins therefrom, said drum being provided with flattened portions of various lengths, the length of such flattened portions being such that certain coins will be wholly retained thereon, while coins of a larger denomination will overhang the same, and means adapted to engage said overhanging portions to remove coins from flattened portions other than their allotted portions.

7. In a fare register in combination, a receiver adapted to receive a mixture of various coins, means passing through said receiver for removing the various coins, a movable cam element connected to said removing means, a register, gearing therefor positioned by said cam for different denominations of coin and reld in position by said cam for certain periods of time, and a mechanism operated by the coin to operate through said gearing to register the coin.

8. In a fare register, in combination, a receiver adapted to receive coins of various denominations, means to remove the coins from said receiver, a register, means normally in the path of said coins adapted to actuate said register, and automatic means adapted to render said actuating means inoperative.

9. In a fare register, in combination, a receiver adapted to receive coins of various denominations, means to selectively remove the coins from said receiver, a register, means normally in the path of said coins adapted to actuate said register, and automatic means adapted to render said actuating means inoperative.

10. In a fare register, in combination, a receiver adapted to receive coins of various denominations, means to selectively remove the coins from said receiver, a register, means adapted to actuate said register, comprising a member having one end normally in the path of said coins, and means adapted to permit said member to be moved out of the path of certain of said coins.

11. In a fare register, in combination, a receiver comprising a single chamber adapted to receive coins of various denominations, means to selectively remove the coins from said receiver, a plurality of receptacles, and means adapted to be moved into and out of operative relation with said first mentioned means to guide certain of said coins into one of said receptacles and certain other of said coins into another of said receptacles.

12. In a fare register, in combination, a receiver adapted to receive coins of various denominations, means to remove the coins from said receiver, a plurality of receptacles, and means adapted to be moved into and out of operative relation with said first mentioned means to guide certain of said coins into one of said receptacles and coins of a different denomination into another of said receptacles.

13. In a fare register a receptacle for an indiscriminate mixture of coin, a carrying element adapted to remove the coin therefrom, a constantly rotating stripper geared to said carrying element adapted to permit but one coin to be carried from said receptacle at the same time, a register for the coin, actuating mechanism for said register adapted to be contacted by a coin on the carrying element to cause operation of said actuating mechanism, and a cam associated with said carrying element adapted to control the periods of operation of said actuating mechanism depending upon the denomination of coin on said carrying element.

14. In a fare register a receiver for coin, a rotatable carrying element therefor, a brush rotatable simultaneously with said element to permit but one coin to pass thereon at the same time, a cam secured to said carrying element, and means operated thereby to eject certain of said coins into a receptacle therefor depending upon the denomination of the coin.

15. In a device of the class described a rotatable carrying element, projections thereon to engage the coin to carry the same, a registering mechanism, driving means therefor, and a cam acting to maintain said means in driving position for different periods of time depending upon the denomination of the coin, to effect the registration thereof.

16. In a fare register, in combination, a receiver adapted to receive coins of various denominations, means to remove the coins from said receiver, a plurality of receptacles, means leading to one of said receptacles to guide certain of the coins therein, and movable means normally held out of the path of the last-mentioned coins and adapted to be moved into the path of certain others of said coins to guide said other coins into the other of said receptacles.

17. In a fare register, in combination, a receiver comprising a single chamber adapted to receive coins of various denominations, means to remove the coins selectively from said chamber, a plurality of receptacles, a chute leading to one of said receptacles to guide certain of the coins therein, and a movable chute adapted to be moved into the path of certain others of said coins and adapted to guide said other coins into the other of said receptacles.

18. In a fare register, in combination, a receiver adapted to receive coins of various denominations, means to remove the coins selectively from said receiver, a plurality of receptacles, a chute leading to one of said receptacles to guide certain of the coins therein, and a movable chute adapted to be moved into the path of coins of other denominations and adapted to guide said coins into the other of said receptacles.

19. In a fare register, in combination, a receiver adapted to receive coins of various denominations, means to remove the coins from said receiver, a register, means adapted to be actuated by certain of said coins as they are removed from said receiver to cause said register to register, and a cam adapted to render the said second mentioned means inoperative, whereby certain of said coins may be removed from said receiver without being registered.

20. In a fare register, in combination, a receiver adapted to receive coins of various denominations, means to remove the coins from said receptacle selectively, a register, means adapted to be actuated by certain of said coins as they are removed from said receptacle to cause said register to register, and automatic means adapted to render said second mentioned means inoperative, whereby certain of said coins may be removed from said receiver without being registered.

21. In a fare register, in combination, a receiver adapted to receive coins of various denominations, means to remove the coins therefrom selectively, a register, a plurality of receptacles adapted to receive the coins after being removed from said receiver, means adapted to permit certain of said coins to pass into one of said receptacles and to cause others of said coins to pass into the other of said receptacles, means actuated by the coins passing into one of said receptacles to cause said register to register, and means for rendering said last-mentioned means inoperative, whereby the coins passing into the other of said receptacles will not be registered.

22. In a fare register, in combination, a receiver adapted to receive coins of various denominations, means to remove the coins therefrom selectively, a register, an accessible receptacle and an inaccessible receptacle adapted to receive the coins after being removed from said receiver, means adapted to permit certain of said coins to pass into said accessible receptacle and to cause others of said coins to pass into said inaccessible receptacle, means actuated by the coins passing into said accessible receptacle to cause said register to register, and means for rendering said last-mentioned means inoperative, whereby the coins passing into said inaccessible receptacle will not be registered.

23. In a fare register, in combination, a receiver adapted to receive coins, automatic means adapted to remove the coins therefrom, and a spring member secured within said automatic means and adapted to project through apertures therein into said receiver to agitate the coins therein.

24. In a fare register, in combination, a receiver adapted to receive coins, means adapted to remove the coins therefrom, and spring actuated means supported adjacent said removing means and projecting therein and through apertures in the walls thereof to agitate the coins within the receiver.

25. In a fare register, in combination, a receiver adapted to receive coins, a rotary member adapted to remove the coins therefrom, said member having an opening formed therein, and means adapted to be projected through said opening to agitate the coins within said receiver.

26. In a fare register, in combination, a receiver adapted to receive coins, a rotary member provided with a plurality of means for engaging the coins to remove them from said receiver said means having an opening formed therein at a point intermediate adjacent coin-receiving means, and means adapted to be projected through said opening to agitate the coins within said receiver.

27. In a fare register, in combination, a receiver adapted to receive coins, a rotary, hollow drum provided with a plurality of peripheral coin-engaging means to remove the coins from said receiver said drum having an opening formed therein at a point intermediate adjacent coin-engaging means, and means extending within said drum and adapted to be projected through said opening to agitate the coins within said receiver.

28. In a fare register, in combination, a receiver adapted to receive coins of various denominations, means to remove the coins from said receiver, a register, means for actuating the same, and means adapted to render said actuating means operative or inoperative with respect to said register depending on the denomination of the coin which is being removed from said receiver.

29. In a fare register, in combination, a receiver adapted to receive coins of various denominations, means to remove the coins from said receiver, a register, means adapted to actuate said register comprising a member having one end normally in the path of said coins, and cam-controlled means adapted to permit said member to be moved out of the path of certain of said coins.

30. In a fare register, in combination, a receiver adapted to receive coins of various denominations, means to remove the coins from said receiver, a register, means adapted to actuate said register comprising a movable member and spring-controlled means normally holding said member in the path of said coins, and means adapted to move said spring-controlled member into inoperative position whereby said movable member may be moved out of the path of certain of said coins.

31. In a fare register, in combination, a receiver adapted to receive coins of various denominations, a member adapted to remove coins therefrom, a register, means actuating said register and normally lying in the path of said coins, means for rendering said actuating means inoperative, and means movable with said member for controlling the operation of said last-mentioned means.

32. In a fare register, in combination, a receiver adapted to receive coins of various denominations, a member adapted to remove the coins therefrom, a register, means for actuating said register and normally lying in the path of said coins, cam-operated means for rendering said actuating means inoperative, and a cam movable with said member for controlling the operation of said last-mentioned means.

33. In a fare register, in combination, a receiver adapted to receive coins of various denominations, a member adapted to remove the coins therefrom and provided with selective coin-transferring means whereby said coins are moved from said receiver selectively, a register, means for actuating said register and normally lying in the path of said coins, cam-operated means for rendering said actuating means inoperative, and a cam movable with said member and provided with operative portions coinciding in position with said selective means for controlling the operation of said last-mentioned means.

34. In a fare register, in combination, a receiver adapted to receive coins of various denominations, a member adapted to remove the coins therefrom and provided with selective coin-transferring means whereby said coins are moved from said receiver selectively, means for actuating said register and normally lying in the path of said coins, cam-operated means for rendering said actuating means inoperative, and a cam movable with said member and provided with raised and depressed portions coinciding in position with said selective means for controlling the operation of said cam-operated means.

35. In a fare register, in combination, a receiver adapted to receive coins of various denominations, a member adapted to remove the coins therefrom and provided with selective coin-transferring means whereby said coins are moved from said receiver selectively, a register, means for actuating said register and normally lying in the path of said coins, cam-controlled means for rendering said actuating means inoperative, and a cam movable with said member and provided with an operative portion coinciding with one of said selective means and adapted to actuate said cam-controlled means to render said actuating means inoperative.

36. In a fare register, in combination, a receiver adapted to receive coins of various denominations, means to remove the coins therefrom, a register, actuating means therefor adapted to be operated by the coins as they are removed from said receiver, and means for maintaining said actuating means in operative relation to coins of different denominations during different intervals of time whereby said register will be actuated different amounts by coins of different denominations.

37. In a fare register, in combination, a receiver adapted to receive coins of various denominations, means to remove the coins therefrom, a register, a swinging arm operatively associated with said register and adapted to be actuated by certain of the coins as they are removed from said receiver, and means for maintaining said swinging arm in operative relation to coins of different denominations during different intervals of time, whereby coins of one denomination will cause said arm to move a certain distance to cause said register to indicate a certain amount, and coins of another denomination will cause said arm to move a different distance to cause said register to indicate a different amount.

38. In a fare register, in combination, a receiver adapted to receive coins of various denominations, a member for removing the coins therefrom, a plurality of receptacles, means leading to one of said receptacles to guide certain of the coins therein, movable means adapted to be moved into the path of certain others of said coins and adapted to guide said other coins into the other of said receptacles, and means movable with said member for controlling the movement of said movable means.

39. In a fare register, in combination, a receiver adapted to receive coins of various denominations, means to remove the coins therefrom, a plurality of receptacles, means leading to one of said receptacles to guide certain of the coins therein, movable means adapted to be moved into the path of certain others of said coins and adapted to guide said other coins into the other of said receptacles, cam-operated means for controlling the movement of said movable means, and a movable cam operatively associated with said cam-operated means.

40. In a fare register, in combination, a receiver adapted to receive coins of various denominations, means setting within said receiver to selectively remove the coins therefrom, individual coin removing elements of different size on said means, one for each denomination of coin to be removed, and rotary means adapted to contact said removing means to prevent the passage of more than one coin at a time and to eject coins of denominations other than the proper denomination when engaged in certain of said elements.

41. In a fare register, in combination, a receiver adapted to receive coins of various denominations, movable means extending within said receiver to remove the coins therefrom, coin engaging elements on said means, certain ones of which are adapted to remove coins of only one denomination, and others of which are adapted to remove coins of another denomination, and rotary mechanism for ejecting coins from said elements when coins of an improper denomination are caught therein.

42. In a fare register in combination, a receiver adapted to receive coins of various denominations, a member extending within said receiver and provided with means to engage the coins of different denominations selectively to move them therefrom, and means co-acting with said member and adapted to disturb coins engaged by means other than their allotted selective means.

43. In a device of the class described, a hopper for indiscriminately mixed coin of various denomination, a rotatable carrying element for removing said coin therefrom, projections thereon to support the coin, a register, actuating mechanisms therefor, a plurality of driving positions for said mechanism, said mechanism adapted to be moved selectively, depending upon the denomination of the coin, and a cam acting to cause the movement of said actuating mechanism for the proper coin to be registered.

44. In a device for sorting and registering coin, a rotatable carrying element for the coin, a register, a plurality of mechanisms to operate the same, one for each different denomination of the coin, and a cam adapted to entrain the proper mechanism to cause registration of the respective coin.

45. In a fare register, in combination, a casing provided with a removable cover, means within said casing for securing the cover thereto, said casing being provided with an opening for permitting access to said securing means, a plurality of receptacles movably engaging said opening and extending within said casing, one of said receptacles being normally movable with respect to said casing and the other of said receptacles being normally immovable with respect to said casing, and co-acting means associated with said receptacles to limit the outward movement of said movable receptacle whereby it cannot be entirely withdrawn from said casing.

46. In a device of the class described a coin hopper, a register to register the coin, and a rotatable drum for carrying the coin from the hopper, said drum having a plurality of varied size flat portions circumferentially alined on the outer surface thereof and projections on the drum coöperating with said flat portions to retain the coin on said drum.

47. In a device for sorting and registering coin, a receiver, a register, a rotatable drum, means on the outer surface thereof for carrying coin, a cam connected therewith, and mechanism operated by said cam to entrain the register differently corresponding to the respective coin carrying means.

48. In a device of the class described, in combination, a receptacle, and a movable member having thereon spaced portions adapted to engage and tend to draw from said receptacle coins of a diameter greater than the distance between said portions.

49. In a device of the class described, in combination, a receptacle, a movable member forming a wall of said receptacle against which coins therein rest, said member being provided with spaced portions adapted to engage and tend to draw from said receptacle coins of a diameter greater than the distance between them.

50. In a device of the class described, in combination, a member provided with a pair of spaced portions adapted to engage and move coins of a diameter greater than the distance therebetween and adapted to hold coins of certain denominations in a position with a portion projecting from said member, and means adapted to engage said projecting portions of said last coins and remove the same from said spaced portions upon said member.

51. In a device of the class described, in combination, a receptacle, a member forming a portion of said receptacle against which coins therein rest and provided with a pair of spaced portions adapted to engage and tend to draw from said receptacle coins of a diameter greater than the space therebetween and adapted to hold larger coins in a position with a portion thereof projecting from said member, and means adapted to engage said projecting portions of said last coins and remove them from said spaced portions upon said member.

52. In a device of the class described, in combination, a receptacle, registering means, means adapted to carry coins of various denominations separately from said receptacle into operative relation to said registering means throughout a portion of their path of travel, and means adapted automatically to vary the length of the path throughout which the coin travels in operative relation to said registering means in accordance with the denomination of the coin.

53. In a device of the class described in combination, a receptacle, a rotary drum forming the bottom of said receptacle, a spring wall forming a part of said receptacle, and projections on said drum adapted to engage the coin and actuate said spring wall to disturb the coin in the receptacle.

54. In a device of the class described, in combination, a receptacle, a rotary drum forming the bottom thereof, a plurality of varied size coin carrying means on said drum for coin of different denomination, disturbing means for the coin adapted to be actuated by said carrying means, and a register connected to be actuated by the coin on the drum.

55. In a device of the class described, in combination, a receptacle adapted to hold coins open to inspection, a second receptacle, manually controlled means adapted at will to discharge said coins from said first receptacle into said second receptacle, a movable member forming a portion of said second receptacle against which the coins therein rest, and means upon said member adapted selectively to engage and carry coins of different denomination from said second receptacle.

56. In a device of the class described, in combination, a receptacle adapted to hold coins open to inspection, a second receptacle, manually controlled means adapted at will to discharge said coins from said first receptacle into said second receptacle, a movable member forming a portion of said second receptacle against which the coins therein rest, means upon said member adapted selectively to engage and carry coins of different denomination from said second receptacle, registering means, and means adapted to actuate said registering means in accordance with the number and denomination of coins carried from said second receptacle.

57. In a fare register, in combination, a receiver having a single receptacle adapted to receive simultaneously coins of various denominations, a drum provided with peripheral coin engaging means to selectively remove the coins from said receiver, means adapted to register the removal of certain of said coins, and means co-acting with the periphery of the drum to remove adhering coins therefrom after they have been registered.

58. In a fare register, in combination, a receptacle for indiscriminately mixed coin, a rotatable drum for removing the coin therefrom, having a plurality of different pockets for particular coin on the outer surface thereof, and a register adapted to be actuated by the coin.

59. In a fare register, in combination, a receiver adapted to receive a mixture of coins of various denominations, and unitary means adapted to engage selectively a plurality of coins of different denominations and positively remove from the receiver all coins received therein.

60. In a fare register, in combination, a receptacle, a register, a coin moving element disposed relatively to the receptacle to engage unlike coins therein, means whereby the coin moving element selectively engages the unlike coins, a plurality of cam controlled register mechanisms, and coin operated means to effect the registration of the coins in accordance with a predetermined unit.

61. In a fare register, in combination, a receptacle, a register, a coin moving element disposed relatively to the receptacle to engage different coins thereon, means adapted to operate the coin moving element to discharge the engaged coins from the receptacle, and means whereby the register is operated to register certain of the coins in accordance with the denomination thereof, and is moved out of operating position to sort and discharge other coins without registering the same.

62. In a fare register, in combination, a receptacle adapted to receive coins of different denomination, a register, carrying means adapted to discharge coins from the receptacle, means adapted to be interposed in the path of the coins to actuate the register, and means controlled by the carrying means conforming to the denomination of the coins to govern the extent of movement of the actuating means.

63. In a fare register, in combination, a ceptacle, a coin operated register, certain registering mechanism controlled and thrown into gear independently of the coin, means coöperatively associated with the receptacle to separately engage coins of different denomination and remove them from the receptacle, and means in the path of the coins adapted to actuate the register in accordance with the coin removed.

64. In a fare register, in combination, a receptacle adapted to receive a complex mass of coins of different denomination, means adapted to selectively separately engage and move each of said coins in a definite path, a register, and means whereby the movement of certain of the coins operates the register in accordance with the denomination of the coins, and not registering certain of said coins.

65. In a fare register, in combination, a receptacle adapted to receive coins in bulk, means adapted to select from the bulk coins of different character and move them in a predetermined path, a register, and means adapted to intersect the path to govern the actuation of the register.

66. In a fare register, in combination, a receptacle adapted to receive and display coins of a predetermined denomination, a receiver or chamber, means adapted to discharge the coins from the receptacle into the receiver, the receiver comprising a coin carrier consisting of a drum with flat portions on the periphery and having means adapted to engage such coins as are permitted to enter the receiver, a register adapted to indicate or register progressively the units of value represented by coins admitted to the receiver, and means adapted to coöperate with the carrier and the register to discharge the coins from the receiver and cause the register to indicate the units of value represented thereby.

67. In a fare register, in combination, a receptacle having an opening adapted to permit the passage of coins of a predetermined size, and a movable bottom, a receiver or chamber, means adapted to discharge the coins from the receptacle into the chamber, a cylinder forming the bottom of said chamber and having coin moving means comprising means adapted to move the coins in a predetermined path, a register, register actuating mechanism, and means adapted to intersect the path of the coins to govern the actuation of the register and distribution of the coins.

68. In a fare register, in combination, a receptacle adapted to receive coins of various denomination in bulk, means provided with a plurality of varied size coin pockets adapted to carry each coin to be registered in an identical path from the receptacle, a register, and means whereby the register is actuated in accordance with the denomination of the coin removed.

69. In a fare register, a hopper receiving mixed coins of different denominations, a rotatable coin carrier forming one wall of said hopper and adapted to remove therefrom the coins separately, pins on said carrier adapted to convey the coins singly to a point of discharge, actuating means for said carrier, and a totalizing mechanism operated through the passage of the coins to register the total value of the coins acting thereon.

70. In a fare register, a hopper receiving mixed coins of different denominations, means for removing the coins singly from said hopper, a register mechanism for operating the same differentially in accordance with the value of the coins in their passage to the discharge point, and a totalizer operated in accordance with the differential mechanism to indicate the total value of the coins moving said differential mechanism.

71. In a fare register, a hopper receiving mixed coins of different denominations, a revoluble coin carrier forming one wall of said hopper, means on said carrier adapted to carry single coins of different denominations miscellaneously from said hopper to a point of discharge, actuating means for said carrier, a totalizer, and mechanism for actuating said totalizer entrained by the coins in their passage to the point of discharge.

72. In a fare register, a hopper receiving mixed coins of different denominations, a revoluble coin carrier forming one wall of said hopper, a plurality of spaced projections on said carrier adapted to carry coins singly from said hopper to the point of discharge, actuating means for said carrier, a totalizer, a driving train for said totalizer actuated by the carrier actuating mechanism but normally disconnected therefrom, a lever operated by the coins in their movement to the discharge point to bring the totalizer driving means in train, and a detent acting to hold the same in train until the coin operating thereon is registered.

73. In a fare register, a hopper receiving mixed coins of different denominations, a coin carrier communicating therewith a plurality of sets of differently spaced projections thereon for separately removing the coins from said hopper and moving them in a predetermined circular path, a totalizer, and means intersecting said path and acted on by said coins to govern the actuation of said totalizer.

In testimony whereof I affix my signature, in the presence of two witnesses.

WILLIAM A. DE HART.

Witnesses:
    EDGAR A. WHITNEY,
    R. S. BLAIR.